(12) United States Patent
Liu et al.

(10) Patent No.: US 10,988,040 B2
(45) Date of Patent: Apr. 27, 2021

(54) CHARGING GUN WITH GOOD HEAT CONDUCTION AND HEAT DISSIPATION PERFORMANCE

(71) Applicant: ROCKING ENERGY INTELLIGENT TECHNOLOGY CO., LTD., Guangdong (CN)

(72) Inventors: Yue Liu, Guangdong (CN); Rongdong Zhong, Guangdong (CN); Tongbing Li, Guangdong (CN); Zhongliang Xu, Guangdong (CN)

(73) Assignee: ROCKING ENERGY INTELLIGENT TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 17/037,651

(22) Filed: Sep. 29, 2020

(65) Prior Publication Data

US 2021/0008992 A1      Jan. 14, 2021

Related U.S. Application Data

(63) Continuation-in-part of application No. PCT/CN2019/073270, filed on Jan. 25, 2019.

(30) Foreign Application Priority Data

Apr. 2, 2018    (CN) .......................... 201810282932.8
Apr. 2, 2018    (CN) .......................... 201820455905.1

(51) Int. Cl.
  *H02J 7/00*   (2006.01)
  *H02J 7/14*   (2006.01)
  (Continued)

(52) U.S. Cl.
  CPC ............. *B60L 53/16* (2019.02); *B60L 53/302* (2019.02)

(58) Field of Classification Search
  USPC ......................................................... 320/107
  See application file for complete search history.

(56) References Cited

U.S. PATENT DOCUMENTS 10,756,498 B1* 8/2020 Sarraf ................. H01M 10/625
2009/0186518 A1* 7/2009 Chadbourne ............ H01R 4/26
                                                                    439/485

(Continued)

FOREIGN PATENT DOCUMENTS

CN        206211121 U      5/2017
CN        107444174 A     12/2017
(Continued)

OTHER PUBLICATIONS

International Search Report of PCT Patent Application No. PCT/CN2019/073270 dated Apr. 24, 2019.

*Primary Examiner* — Alexis B Pacheco

(57) ABSTRACT

A charging gun having excellent heat conduction and dissipation performance, comprising a gun body, terminals, insulated sleeves, and a metal heat dissipation member; rear end portions of the terminals pass through the sleeves, the metal heat dissipation member is opened with mounting holes for inserting and fixing the sleeves, and the metal heat dissipation member is fixed to the gun body. The present solution prevents short circuiting by using metal heat dissipation member as a body for fixing the terminals and by using insulated sleeves to separate metal heat dissipation member from the terminals. Large ceramic members that conventionally fix terminals are removed, thus preventing the difficulty wherein a ceramic member having a large volume tends to break when a hole is opened thereon. Processes for processing the sleeves and opening the mounting holes on the metal heat dissipation member are all convenient, having a low level of machining difficulty.

12 Claims, 6 Drawing Sheets

(51) Int. Cl.
*B60L 53/16* (2019.01)
*B60L 53/302* (2019.01)

(56) References Cited

U.S. PATENT DOCUMENTS

| | | | |
|---|---|---|---|
| 2016/0221460 A1* | 8/2016 | Spesser | B60L 11/1818 |
| 2017/0144558 A1* | 5/2017 | Remisch | H01R 13/005 |
| 2019/0168626 A1* | 6/2019 | Spesser | B60L 53/302 |
| 2019/0295743 A1* | 9/2019 | Sato | H01B 7/425 |
| 2020/0275582 A1* | 8/2020 | Wu | B60L 53/302 |
| 2020/0317070 A1* | 10/2020 | Fuhrer | B60L 53/16 |

FOREIGN PATENT DOCUMENTS

| | | |
|---|---|---|
| CN | 206781559 U | 12/2017 |
| CN | 107809033 A | 3/2018 |
| CN | 207156974 U | 3/2018 |
| CN | 208134122 U | 11/2018 |
| CN | 208134123 U | 11/2018 |

* cited by examiner

CHARGING GUN WITH GOOD HEAT CONDUCTION AND HEAT DISSIPATION PERFORMANCE

CROSS REFERENCE TO RELATED APPLICATIONS

The present application is a Continuation-In-Part Application of PCT Application No. PCT/CN2019/073270 filed on Jan. 25, 2019, which claims the benefit of Chinese Patent Application Nos. 201810282932.8 and 201820455905.1 filed on Apr. 2, 2018. All the above are hereby incorporated by reference. the contents of which are incorporated herein by reference in their entirety.

FIELD OF THE INVENTION

The invention relates to the technical field of charging piles, and in particular to a charging gun with good heat conduction and heat dissipation performance.

BACKGROUND OF THE INVENTION

Battery electric vehicles (BEV) are a kind of vehicles that are powered by on-board power supply and driven by motors and that meet requirements of road traffic and safety regulations. As battery electric vehicles have less environmental impact than traditional vehicles, their prospects are widely optimistic. In recent years, battery electric vehicles become increasingly popular, however, the problem of how to charge battery electric vehicles in a timely and effective manner has also occurred. Charging piles, which are a kind of devices designed to facilitate timely charging of battery electric vehicles or other products, have received extensive attention and recognition once they came out.

Market demands for electric vehicles such as battery electric vehicles and hybrid electric vehicles are expanding, and demands for charging guns are also increasing. When an existing charging gun is connected to a battery electric vehicle for charging, a gun head of the charging gun needs to be plugged in to a charging interface of a battery electric vehicle to be charged, and plug-in terminals in the gun head are connected to docking terminals of the battery electric vehicle for charging. However, heat will be generated after the plug-in terminals in the gun head of the charging gun are connected to the docking terminals of the battery electric vehicle for charging, which heat will cause the temperature of the charging gun to rise, and there is a hidden danger of charging safety. Therefore, there is an urgent need in the market to solve the heat dissipation problem of charging guns. The patent application with the application number of CN 201720524021.2 discloses an explosion-proof charging gun with high temperature resistance and flame retarding function. Specifically, a terminal fixing part used for fixing terminals is made of a ceramic material, so that heat generated by the terminals can be dissipated through the terminal fixing part made of a ceramic material.

However, the solution disclosed in the abovementioned patent application has the following drawbacks: since the terminal fixing part has to be plugged in with a number of terminals (including at least two charging terminals with larger diameters and a plurality of communication terminals), it is necessary to provide a number of holes correspondingly in the terminal fixing part. The accuracy requirements for drilling is high, and the volume of the terminal fixing part must be large enough to distribute and fix the terminals. However, there are the following contradictions in the processing technology of the fixing part: insulating and thermally conductive ceramic parts are generally fragile, and broken ceramic parts will lead to shorter creepage distances or even short circuit, causing safety problems; the larger the volume of the ceramic terminal fixing part, the more fragile the ceramic terminal fixing part when it is drilled or polished; the internal space is limited during assembly, hole walls of the ceramic part will be designed to be thinner, and the ceramic part will easily crack when it is plugged in with a thick cable; the ceramic part must be replaced as a whole once it is damaged, and it is difficult to form a number of high-precision holes in a large-volume ceramic part. Therefore, limited by the processing technology, the volume of the terminal fixing part must be controlled within a certain range. However, the smaller the terminal fixing part, the worse the heat dissipation effect. The ceramic material terminal fixing part with a limited volume will reduce the heat dissipation effect of the charging gun. Moreover, when the charging gun is plugged in to a charging base of the battery electric vehicle, the charging base of the battery electric vehicle will impact the terminal fixing part, and a traditional terminal fixing part made of a ceramic material is easy to crack.

SUMMARY OF THE INVENTION

In view of the abovementioned technical problems existing in the prior art, the invention provides a charging gun with good heat conduction and heat dissipation performance which is easy to manufacture and can improve heat dissipation effect of the charging gun.

In order to achieve the abovementioned objective, the invention provides the following solutions.

A charging gun with good heat conduction and heat dissipation performance is provided, which includes a gun body, terminals, insulating sleeves, and a metal heat dissipation member; rear end portions of the terminals pass through the sleeves, the metal heat dissipation member is provided with mounting holes through which the sleeves pass and to which the sleeves are fixed, and the metal heat dissipation member is fixed to the gun body.

In a preferable embodiment, the metal heat dissipation member is a non-hollow solid.

In a preferable embodiment, the sleeves are provided with buffer rings in front end portions, and the terminals pass through the buffer rings.

In a preferable embodiment, the sleeves are designed as sleeves made of high temperature resistant ceramic materials, sleeves made of plastic materials, or sleeves made of high temperature resistant composite materials.

In a preferable embodiment, the front end portions of the sleeves extend out of a front end surface of the metal heat dissipation member; rear end portions of the sleeves extend out of a rear end surface of the metal heat dissipation element, and sections of the sleeves extending out of the metal heat dissipation member are sleeved with high temperature resistant plastic parts.

In a preferable embodiment, a peripheral side of the metal heat dissipation member is provided with a plurality of heat dissipation fins.

In a preferable embodiment, a heat dissipation air duct is formed between two adjacent heat dissipation fins, and the heat dissipation fins are arranged along length directions of the terminals or arranged along radial directions of the terminals or spirally arranged around the metal heat dissipation member.

In a preferable embodiment, the peripheral side of the metal heat dissipation member is provided with an air blowing unit capable of generating air convection.

In a preferable embodiment, the air blowing unit is a fan or an air blowing tube.

In a preferable embodiment, the metal heat dissipation member includes an inner base body and an outer base sleeve; the outer base sleeve is sleeved outside the inner base body, the mounting holes are provided in the inner base body, and the heat dissipation fins are provided on an outer side of the outer base sleeve.

In a preferable embodiment, a heat-insulating plastic sleeve or rubber sleeve with heat dissipation holes is sleeved on an outer peripheral side of the metal heat dissipation member.

The Beneficial Effects Achieved in the Invention

A charging gun with excellent heat conduction and dissipation performance, includes a gun body, terminals, insulated sleeves, and a metal heat dissipation member; rear end portions of the terminals pass through the sleeves, the metal heat dissipation member is provided with mounting holes for plugging in and fixing the sleeves, and the metal heat dissipation member is fixed to the gun body. Compared with the existing technology, the present solution prevents short circuiting by using the metal heat dissipation member as a body for fixing the terminals and by using the insulated sleeves to separate the metal heat dissipation member from the terminals. Large ceramic parts that are conventionally used to fix terminals are removed, thus preventing the difficulty wherein a ceramic part having a large volume tends to crack when a hole is provided therein. Processes for processing the sleeves and providing the mounting holes in the metal heat dissipation member are all convenient, resulting in a low level of machining difficulty. More important, metals have good heat dissipation performance, thus by using the metal heat dissipation member as a body for fixing the terminals, the heat dissipation performance thereof is greatly improved and the high heat dissipation requirements for a charging gun can be met.

REFERENCE SIGNS

Figure 1:
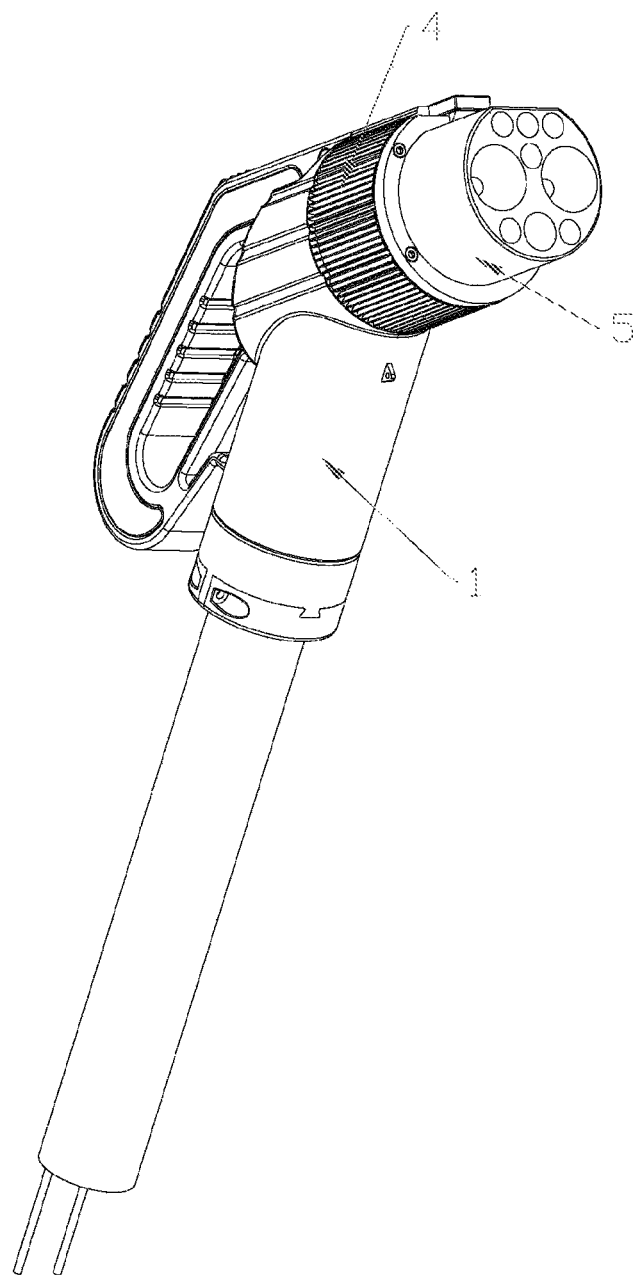
FIG. 1 is a schematic view of a structure of a charging gun with good heat conduction and heat dissipation performance according to an embodiment.

Gun body 1;
Terminal 2;
Sleeve 3;

Metal heat dissipation member 4, inner base body 41, groove 411, outer base sleeve 42, heat dissipation fin 421, threaded hole 422;
Socket base 5;
Buffer ring 6; and
Plastic part 7.

DETAILED DESCRIPTION OF PREFERRED EMBODIMENTS

The invention will be described in detail below with reference to specific embodiments and drawings.

Figure 2:
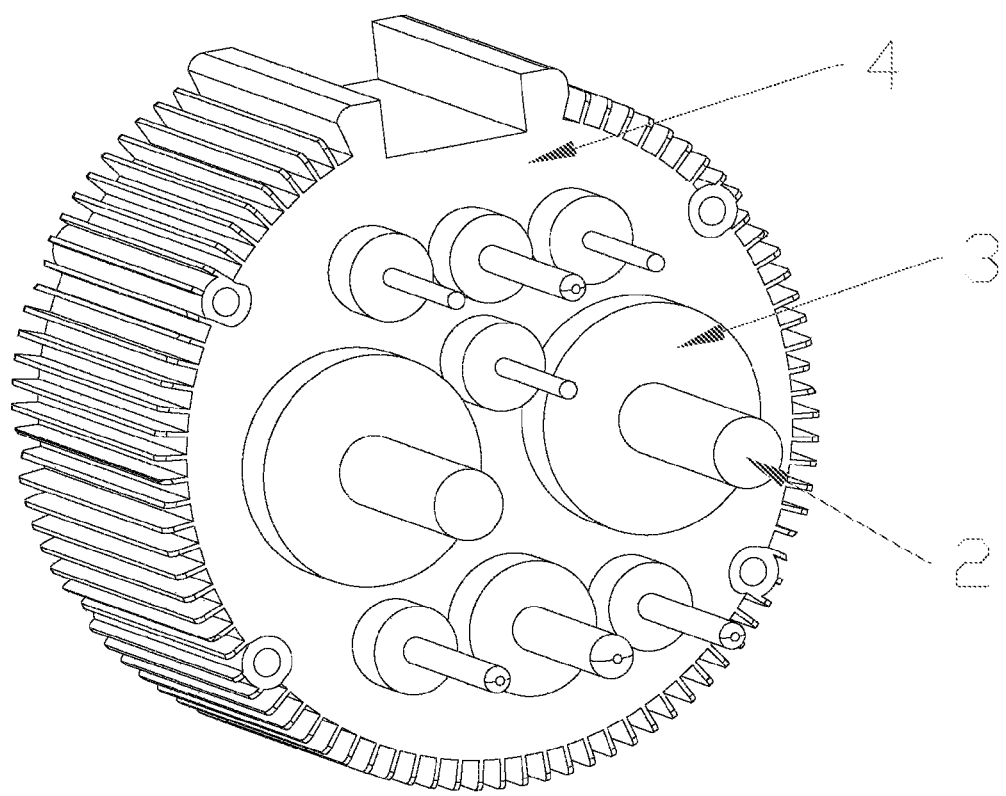
FIG. 2 is a schematic view of a structure of a metal heat dissipation member which is integrated according to an embodiment.

A charging gun with good heat conduction and heat dissipation performance according to the embodiment, as shown in FIGS. 1 to 2, includes a gun body 1, terminals 2, insulating sleeves 3, and a metal heat dissipation member 4. Rear end portions of the terminals 2 pass through the sleeves 3. The metal heat dissipation member 4 is provided with mounting holes for plugging in and fixing the sleeves 3. The metal heat dissipation member 4 is fixed to the gun body 1. Compared with the prior art, the invention uses the metal heat dissipation member 4 as a main body for fixing the terminals 2, and the metal heat dissipation member 4 and the terminals 2 are separated by insulating sleeves 3, which avoids short circuit. Traditional large ceramic parts for fixing the terminals 2 are removed, which avoids the difficulty that a large-volume ceramic part is easy to crack when drilled. The processes of machining the sleeves 3 and providing the mounting holes in the metal heat dissipation member 4 are relatively convenient and low-difficulty. More important, metals have good heat dissipation performance, so that the metal heat dissipation 4, used as the main body for fixing the terminals 2, greatly improves the heat dissipation effect, and can meet higher heat dissipation requirements for charging guns.

It should be noted that in conventional thinking, since the terminals 2 need to be energized to charge vehicles, metal parts of the charging gun should be kept away from the terminals to avoid short circuit. In the prior art, insulating materials are generally used to make a base body for fixing terminals. However, in order to solve the problems that a large-volume ceramic part is easy to crack when drilled, a ceramic heat dissipation member cannot meet requirements, and a ceramic part has cracked after it is drilled, the conventional thinking of those skilled in the art is broken in the invention, instead the metal heat dissipation member 4 made of metal materials is used as the main body for fixing the terminals 2, and the metal heat dissipation member 4 and the terminals 2 are separated by insulating sleeves 3, which can achieve unexpected technical effects while solving the above technical problems well.

Figure 4:
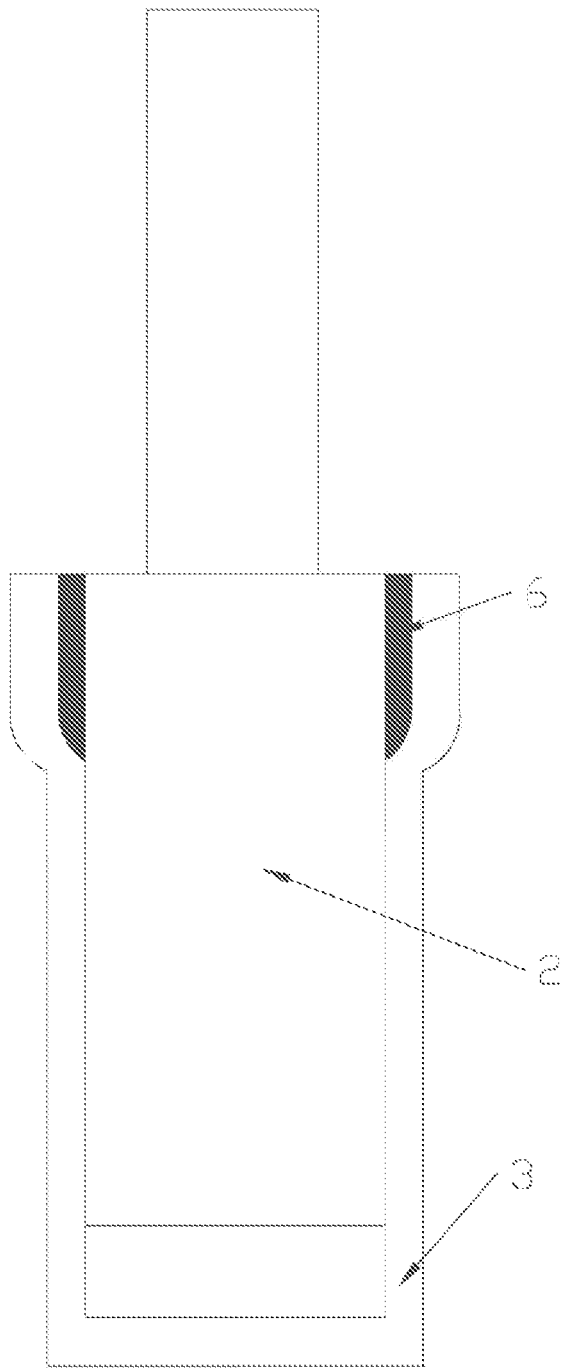
FIG. 4 is a schematic view of a structure of a terminal and a sleeve of a charging gun with good thermal and heat dissipation performance according to an embodiment.

In this embodiment, as shown in FIG. 4, a buffer ring 6 is arranged at the inner side of a front end portion of the sleeve 3, and the terminal 2 passes through the buffer ring 6. The buffer ring 6 is made of a soft metal or a soft plastic, so that when the charging gun is plugged in and out, a radial force applied by the terminal will not crush the front end portion of the sleeve 3.

In this embodiment, the metal heat dissipation member 4 is a non-hollow solid, and a metallic solid transfers heat quickly. The sleeves 3 are made of high-temperature resistant ceramic materials. The wall thickness of the sleeves 3 can be in a range from 2 mm to 4 mm, which plays a role of separation and insulation and is convenient for processing and installation. In order to show a sleeve 3 in the figure, the sleeve 3 is shown relatively largely. In practice, the wall thickness of the sleeve 3 can be much smaller.

Figure 5:
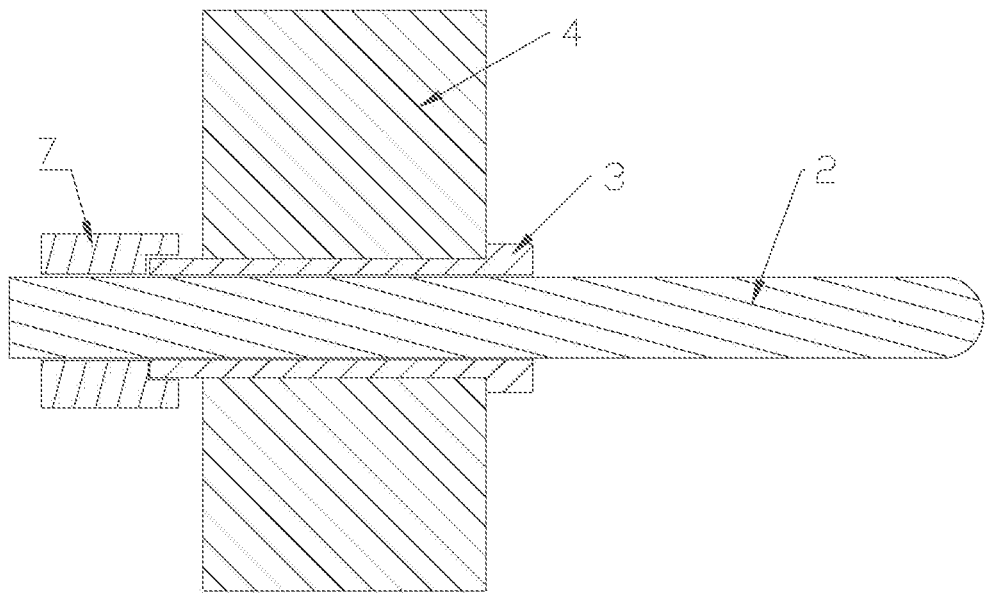
FIG. 5 is a schematic view of relationship of the metal heat dissipation, the sleeve and the terminal according to an embodiment.

Refer to FIGS. 2 and 5. In this embodiment, a front end portion of the sleeve 3 (an end portion closer to the socket base 5) extends out of a front end surface of the metal heat dissipation member 4, and a rear end portion of the sleeve 3 extends out of a rear end surface of the metal heat dissipation member 4. A section of the sleeve 3 extending out of the metal heat dissipation member is sleeved with a high temperature resistant plastic part 7, which ensures a creepage distance between the terminal 2 and the metal heat dissipation member 4 and prevents short circuit.

Figure 3:
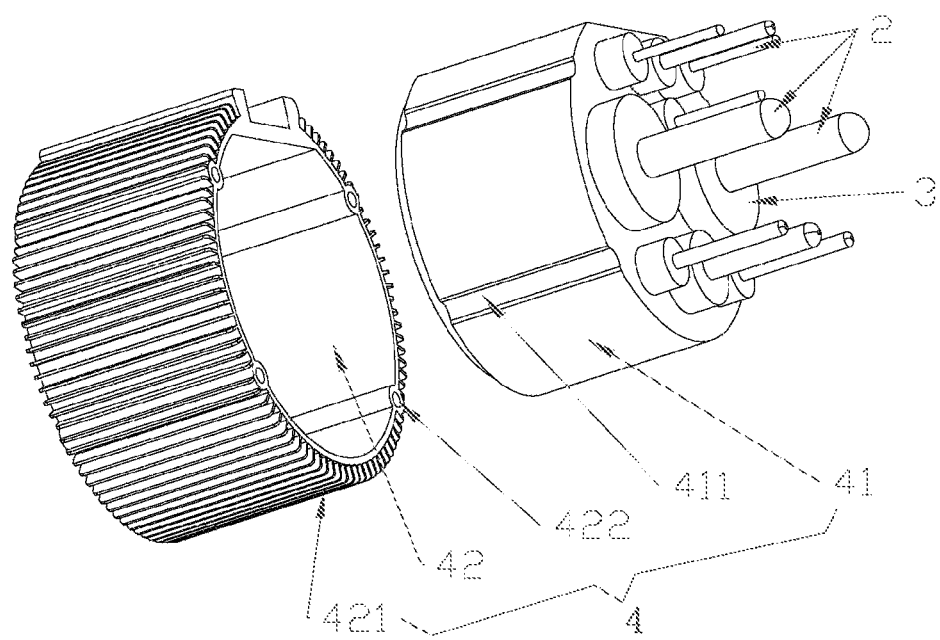
FIG. 3 is an exploded view of another structure of the metal heat dissipation member according to an embodiment.

In this embodiment, the metal heat dissipation member may be in a compact integrated structure as shown in FIG. 2, or it may be in a split structure. The split structure is shown in FIG. 3. The metal heat dissipation member 4 includes an inner base body 41 and an outer base sleeve 42 which are all made of metals. The outer base sleeve 42 is sleeved on the inner base body 41, and mounting holes are provided in the inner base body 41. The advantage of dividing the metal heat dissipation member 4 into two parts is that in terms of processing, the inner base body 41 and the outer base sleeve 42 can be formed simultaneously. The inner base body 41, the sleeves 3, and the terminals 2 are first assembled into a part, and then this part can be assembled with the outer base sleeve 42, which results in high production efficiency. As shown in FIG. 3, the outer periphery of the inner base body 41 is provided with strip-shaped grooves 411, bases of threaded holes 422 of the outer base sleeve 42 protrude inward, and the protruding portions are embedded in the grooves 411 to clamp each other in the circumferential direction and are limited in positions. Then the outer base sleeve 42, the gun body 1, and the front socket base 5 are fixed by bolts. The outer peripheral side of the metal heat dissipation member 4 is sleeved with a heat-insulating plastic sleeve or rubber sleeve (not shown) with heat dissipation holes to prevent users from being scalded by the metal heat dissipation member 4 with a high temperature. A plurality of heat dissipation fins 421 are arranged on the peripheral side of the outer base sleeve 42, and a heat dissipation air duct is formed between two adjacent heat dissipation fins 421. The outer periphery of the metal heat dissipation member 4 protrudes outward relative to the gun body 1, that is, the diameter of a member for fixing terminals 2 is larger than that of the gun body 1, so that two ends of the heat dissipation air ducts in the outer base sleeve 42 are connected with the atmosphere, which facilitates an air blowing unit to generate air convection in the heat dissipation air ducts to take away heat. Only the heat dissipation fins 421 are shown protruding in the figures. In practice, the metal heat dissipation element 4 can be protruded more outward to expose the two end surfaces of the metal heat dissipation element 4.

In practice, the heat dissipation fins 421 can be arranged along the length directions of the terminals 2 as shown in the figures. In addition, the heat dissipation fins 421 can also be arranged along the radial directions of the terminals 2. If the heat dissipation fins 421 are arranged along the radial direction, air inlets and air outlets should be provided in the plastic sleeve. The heat dissipation fins 421 can also be arranged spirally around the metal heat dissipation member. The spiral arrangement can extend the heat dissipation air ducts, and increase heat dissipation area, so that more heat is transferred into the atmosphere by wind.

In this embodiment, the peripheral side of the metal heat dissipation member 4 is provided with an air blowing unit capable of generating air convection. In actual use, the heat generated after the terminals 2 are energized will be transferred to the metal heat dissipation member 4 and then be dissipated outward. Under the action of the air blowing unit, heat of the metal heat dissipation member 4 is accelerated to dissipate into the atmosphere, and the heat generated by the terminals 2 is correspondingly accelerated to transfer to the metal heat dissipation member 4, so that the heat dissipation effect is greatly improved and higher heat dissipation requirements for charging guns can be satisfied.

Figure 6:
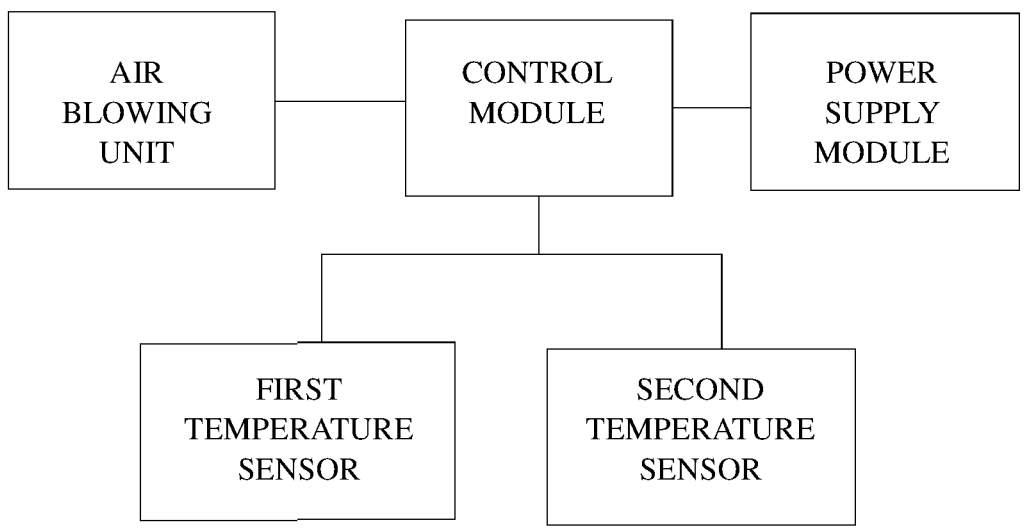
FIG. 6 is a block diagram showing control of an air blowing unit according to an embodiment.

In this embodiment, the air blowing unit is a fan, specifically a small fan driven by a motor, and the small fan blows to the heat dissipation air ducts. Alternatively, the air blowing unit includes an air blowing tube and an air pump. One end of the air blowing tube is connected with the air pump, and the other end faces toward outside of the member for fixing terminals. The air blowing tube may have multiple branch pipes and one main pipe. One ends of the multiple branch pipes are connected with the main pipe, and the other ends of the multiple branch pipes are respectively aligned with multiple heat dissipation air ducts, so that stronger air convection can be generated more accurately in the heat dissipation air ducts. Stronger air convection takes away more heat, and the heat dissipation effect is better. A control module electrically connected to the air blowing unit and temperature sensors electrically connected to the control module are also included. The temperature sensors are used to send sensed temperature information to the control module, so that the control module controls start and stop of the air blowing unit and air blowing intensity. A function module structure is established, so that a computer system is controlled by computer program instructions. As shown in the block diagram in FIG. 6, the control module is further connected with a power supply module for power supply, and two temperature sensors are arranged in parallel. Since the control module is arranged in the gun body 1, it is more accurate and fast to receive the temperature information from the temperature sensors, so that the air blowing unit is precisely controlled. When the temperature sensors detect that the temperature of the gun body 1 reaches a preset temperature, the control module starts the air blowing unit to blow heat to the pile body, so as to speed up heat diffusion into the atmosphere, which avoids the problem that the charging gun must be powered off to cool down due to its two high temperature. Moreover, air cooling intensity of the air blowing unit can be further controlled according to temperatures and charging times, so that air cooling requirements in different situations can be met, and the charging gun is more intelligent.

Finally, it should be noted that the above embodiments are only used to illustrate the technical solutions of the invention, rather than to limit the scope of protection of the invention. Although the invention has been described in detail with reference to preferred embodiments, those of ordinary skill in the art should understood that the technical solutions of the invention can be modified or equivalently replaced without departing from the essence and scope of the technical solution of the invention.

What is claimed is:

1. A charging gun with good heat conduction and heat dissipation performance, wherein the charging gun with good heat conduction and heat dissipation performance includes a gun body, terminals, insulating sleeves, and a metal heat dissipation member suitable for dissipating heat to outside air; there are a plurality of terminals and a plurality of sleeves; rear end portions of the plurality of terminals respectively pass through the plurality of sleeves which are independent of each other, the metal heat dissipation member is provided with a plurality of mounting holes, the plurality of sleeves pass through the plurality of mounting holes and are fixed to the mounting holes, respectively, and the metal heat dissipation member is fixed to the gun body.

2. The charging gun with good heat conduction and heat dissipation performance according to claim 1, wherein the sleeves are provided with buffer rings in front end portions, and the terminals pass through the buffer rings.

3. The charging gun with good heat conduction and heat dissipation performance according to claim 1, wherein the sleeves are configured as sleeves made of high temperature resistant ceramic materials, sleeves made of plastic materials, or sleeves made of high temperature resistant composite materials.

4. The charging gun with good heat conduction and heat dissipation performance according to claim 1, wherein front end portions of the sleeves extend out of a front end surface of the metal heat dissipation member; rear end portions of the sleeves extend out of a rear end surface of the metal heat dissipation member, and sections of the sleeves extending out of the metal heat dissipation member are sleeved with high temperature resistant plastic parts.

5. The charging gun with good heat conduction and heat dissipation performance according to claim 1, wherein a peripheral side of the metal heat dissipation member is provided with a plurality of heat dissipation fins.

6. The charging gun with good heat conduction and heat dissipation performance according to claim 5, wherein a heat dissipation air duct is formed between two adjacent heat dissipation fins, and the heat dissipation fins are arranged along length directions of the terminals or arranged along radial directions of the terminals or spirally arranged around the metal heat dissipation member.

7. The charging gun with good heat conduction and heat dissipation performance according to claim 5, wherein the peripheral side of the metal heat dissipation member is provided with an air blowing unit capable of generating air convection.

8. The charging gun with good heat conduction and heat dissipation performance according to claim 7, wherein the air blowing unit is a fan, an air blowing tube or an air pump.

9. The charging gun with good heat conduction and heat dissipation performance according to claim 5, wherein the metal heat dissipation member includes an inner base body and an outer base sleeve; the outer base sleeve is sleeved outside the inner base body, the mounting holes are provided in the inner base body, and the heat dissipation fins are provided on an outer side of the outer base sleeve.

10. The charging gun with good heat conduction and heat dissipation performance according to claim 1, wherein a heat-insulating plastic sleeve or rubber sleeve with heat dissipation holes is sleeved on an outer peripheral side of the metal heat dissipation member.

11. The charging gun with good heat conduction and heat dissipation performance according to claim 6, wherein the peripheral side of the metal heat dissipation member is provided with an air blowing unit capable of generating air convection.

12. The charging gun with good heat conduction and heat dissipation performance according to claim 11, wherein the air blowing unit is a fan, an air blowing tube or an air pump.

* * * * *